United States Patent [19]
Miyakawa et al.
[11] 4,214,031
[45] Jul. 22, 1980

[54] CONDUCTIVE SUBSTRATE FOR ELECTROSENSITIVE RECORDING MATERIAL

[75] Inventors: Nobuhiro Miyakawa, Kobe; Eiichi Inoue; Hiroshi Kokado, both of Tokyo, all of Japan

[73] Assignee: Mita Industrial Company Limited, Osaka, Japan

[21] Appl. No.: 679,358

[22] Filed: Apr. 22, 1976

[30] Foreign Application Priority Data

Apr. 28, 1975 [JP] Japan ........ 50-50691

[51] Int. Cl.$^2$ ........ B32B 7/02; B32B 7/10

[52] U.S. Cl. ........ 428/213; 428/246; 428/260; 428/262; 428/264; 428/265; 428/279; 428/304; 428/311; 428/315; 428/507; 428/514; 428/515; 427/58; 427/121; 427/342; 427/443.1; 427/443.2; 427/439

[58] Field of Search ........ 427/58, 121, 126, 342, 427/439, 430 A, 430 B; 428/304, 311, 316, 507, 511, 514, 526, 530, 537, 213, 246, 260, 262, 264, 265, 279, 515; 204/2

[56] References Cited

U.S. PATENT DOCUMENTS

| | | | |
|---|---|---|---|
| 3,486,932 | 12/1969 | Schaper et al. | 428/342 |
| 3,515,648 | 6/1970 | Chiu et al. | 204/2 |
| 3,607,377 | 9/1971 | Cross et al. | 428/342 |
| 3,619,284 | 11/1971 | Ray-Chaudhuri et al. | 428/342 |
| 3,823,034 | 7/1974 | Higaki et al. | 204/2 X |
| 3,932,564 | 1/1976 | Markhart et al. | 428/511 X |
| 3,935,335 | 1/1976 | Maruyama et al. | 427/121 |

*Primary Examiner*—George F. Lesmes
*Assistant Examiner*—R. Eugene Varndell
*Attorney, Agent, or Firm*—Sherman & Shalloway

[57] ABSTRACT

An electroconductive substrate for an electrically responsive recording material comprising a porous substrate and a layer of at least one cationic or anionic electric conductor, the conductor layer being formed in the porous substrate along the entire thickness direction thereof extending from one surface of the porous substrate to the other surface of the porous substrate, wherein the conductor layer has a multilayer distribution structure comprising (a) a layer of a cationic electroconductive resin distributed predominantly in the one surface portion of the porous substrate, (b) a layer of an anionic electroconductive resin distributed predominantly in the other surface portion of the porous substrate and (c) a layer of a polysalt of the cationic electroconductive resin and the anionic electroconductive resin interposed between both the electroconductive resin layers (a) and (b) in such a positional relationship that the polysalt layer (c) is adjacent to the electroconductive resin layers (a) and (b).

16 Claims, 13 Drawing Figures

CONDUCTIVE SUBSTRATE FOR ELECTROSENSITIVE RECORDING MATERIAL

This invention relates to a conductive substrate for an electrosensitive recording material. More particularly, the invention relates to a conductive substrate for an electrically responsive recording material which has a novel multi-layer structure comprising a cationic electroconductive layer, an anionic electroconductive layer and a polycomplex layer interposed between the two electroconductive layers.

In the instant specification and claims, the term "electrically responsive recording material" is used to express the concept including all recording materials capable of making a recording in response to electric signals or by combining electric energy with other energy, for example, light energy, such as electrolytic recording materials, electrophotographic sensitive materials and electrostatic recording materials.

It is known in the art that a product formed by coating or impregnating a porous substrate such as paper with an electroconductive resin is used as a substrate for an electrolytic recording paper, an electrophotographic sensitive paper or an electrostatic recording paper (see, for example, specifications of U.S. Pat. Nos. 3,001,918 and 3,110,621). Known electroconductive resins used in this field are divided into three types, namely non-ionic, anionic and cationic types, according to the kinds of functional or polar groups possessed by these resins. It is said that in these electroconductive resins, the electric resistance is generally lower in an order of the cationic resin, the anionic resin and the non-ionic resin.

Electric characteristics of paper substrates formed by application of these electroconductive resins, however, are still unsatisfactory even when cationic electroconductive resins having a highest conductivity among these three types of the resins are employed.

For example, in the case of electrolytic recording papers, it is said that at least one of the following 4 mechanisms participates in initiation of coloration by electric energy:

(a) Introduction of different ions into paper.

(b) Discharge of ions from an electrode falling in contact with paper.

(c) Oxidation or reduction on the surface of an electrode falling in contact with paper.

(d) Increase of the concentration of specific ions on the surface of an electrode falling in contact with paper (pH change).

Accordingly, whatever coloration mechanism may be adopted, in order to obtain a clear colored image promptly, it is important that the electrolytic recording paper used should be sufficiently electrically conductive under treatment conditions. In most of electrolytic recording papers formed by coating or impregnation of these known electroconductive resins, the electric conductivity is generally low under relatively low humidity conditions, for instance, when allowed to stand still in open air, and their properties are not sufficiently manifested unless they are in the considerably wet state. Therefore, conventional electrolytic recording papers should be stored in the wet state or the recording paper-storing part should be especially arranged so that sufficient air-tightness can be maintained.

Electrophotographic recording papers and the like that can retain a necessary conductivity even when allowed to stand still in open air have heretofore been prepared by impregnating paper substrates with a large quantity of a moisture-absorbing material, for example, a water-soluble inorganic salt, simultaneously with coating or impregnation of electroconductive resins to thereby maintain suitable moisture contents in recording papers. In this case, however, the paper substrate per se is highly moisture-absorptive and further, since the electroconductive resin is water-soluble, the so-called tacking phenomenon in which recording papers adhere to one another is readily caused to occur.

It is also known in the art to use a cationic conductor and an anionic conductor in combination for formation of a conductive layer of an electrically responsive recording paper. For example, Japanese Patent Publication No. 19195/69 discloses formation of a conductive layer by forming a single solution of a polycation and an anionic activating agent and coating this solution on a support. However, when a cationic electroconductive resin, which is highly electrolytic, is mixed with an anionic electroconductive resin, a polymeric electrolytic complex (polysalt) insoluble in ordinary solvents is formed and it is absolutely difficult to coat or impregnate a paper substrate with this polysalt.

We found that when one surface of a porous substrate such as paper or a porous substrate impregnated with a water-soluble inorganic salt or an organic moisture-absorbing substance is coated or impregnated with a cationic electroconductive resin and the other surface of the porous substrate is coated or impregnated with an anionic conductive resin, there is formed an electroconductive substrate having a novel multi-layer distribution structure in which, it is believed, the cationic electroconductive resin is distributed predominantly on one surface of the porous substrate, the anionic electroconductive resin is distributed predominantly on the other surface of the porous substrate and a polymeric electrolytic complex (polysalt) is formed in the interface between them. It was also found that this electroconductive substrate has various novel and prominent electric characteristics.

This electroconductive substrate of this invention having the above-mentioned novel multi-layer distribution structure has a much higher electric conductivity than conventional electroconductive substrates formed by impregnating both the surfaces of porous substrates with the same electroconductive resin. The electroconductive substrate of this invention, when the cationic resin-coated surface is connected to the side of an anode and the anionic resin-coated surface is connected to the side of a cathode, has a much higher electric conductivity than when connected contrariwise, and hence, it shows an effective rectifying property. This phenomenon is a novel phenomenon that has not been observed in any conventional electroconductive substrates formed by using electroconductive resins. Accordingly, there is attained an advantage that the electric conductivity can be drastically enhanced selectively in one direction of the electroconductive substrate.

The electroconductive substrate of this invention having the above-mentioned novel multi-layer distribution structure, especially when prepared from a paper substrate impregnated with a water-soluble inorganic salt or an organic moisture-absorbing substance, has a much reduced humidity dependence of the electric conductivity as compared with known paper substrates which have been subjected to electroconductive treatments. Furthermore, the tacking tendency is much reduced in the electroconductive substrate of this invention. Accordingly, there can be attained an advantage that a high electric conductivity can be obtained even at a low humidity without occurrence of the undesirable tacking phenomenon.

By virtue of these advantages, when the electroconductive substrate of this invention having the above-mentioned novel multi-layer distribution structure is used for production of various electrically responsive recording papers, an electric conductivity suitable for electrically responsive recording can always be retained with good reproducibility, special considerations need not be paid for storing or application of recording papers and the problem of tacking of recording papers can be effectively solved.

This invention will now be described in detail by reference to the accompanying drawings, in which.

Figure 1:
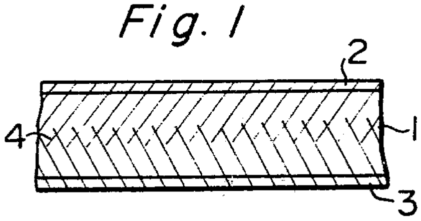
FIG. 1 is a sectional view showing diagrammatically one embodiment of the electroconductive substrate of this invention having the above-mentioned novel multi-layer distribution structure.

Referring now to FIG. 1 illustrating diagrammatically one instance of the electroconductive substrate of this invention, one surface of a porous substrate 1 is coated or impregnated with a cationic electroconductive resin 2, and the other surface is coated or impregnated with an anionic electroconductive resin 3. As indicated by oblique lines in the drawings, these cationic and anionic electroconductive resins 2 and 3 permeate into the interior of the porous substrate 1, and in the interface between both the resins, a polymeric electrolytic complex (polysalt) 4 is formed by the reaction between both resins. From FIG. 1, it will readily be understood that the electroconductive substrate of this invention has a multi-layer distribution structure comprising a first surface layer composed of the cationic electroconductive resin 2, a second surface layer composed of the anionic electroconductive resin 3 and an intermediate layer composed of the polysalt 4, which is interposed between the first and second surface layers.

Figure 2:
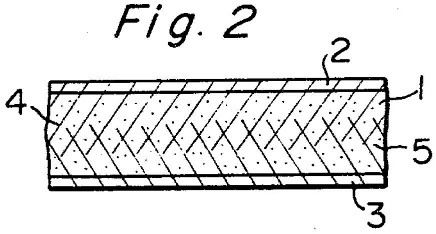
FIG. 2 is a sectional view showing another embodiment of the electroconductive substrate of this invention.

Referring now to FIG. 2 illustrating diagrammatically another instance of the electroconductive substrate of this invention, the entire of a porous substrate 1 is impregnated with a water-soluble inorganic salt or organic moisture-absorbing substance 5, and one surface of the impregnated porous substrate 1 is impregnated or coated with a cationic electroconductive resin 2 and the other surface is impregnated or coated with an anionic electroconductive resin 3. As in the case of the electroconductive substrate shown in FIG. 1, a multilayer distribution structure is manifested in this electroconductive substrate shown in FIG. 2.

Figure 3:
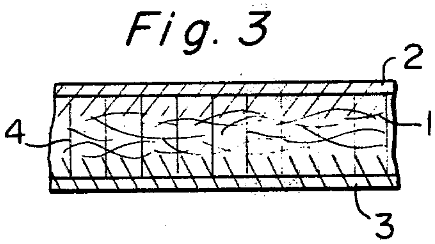
FIG. 3 is a sectional view showing still another embodiment of the electroconductive substrate of this invention.

Referring now to FIG. 3 showing still another instance of the electroconductive substrate of this invention, by impregnating the entire of a porous substrate 1 with a cationic electroconductive resin and an anionic electroconductive resin, a layer of a polysalt 4 extending along the entire thickness direction of the porous substrate 1 is formed, and a coating layer of the cationic electroconductive resin 2 is formed on one surface of the polysalt layer 4 and a coating layer of the anionic electroconductive resin 3 is formed on the other surface of the polysalt layer 4. In this case, the polysalt layer 4 is formed by (A) dipping the porous substrate 1 in a solution of the cationic electroconductive resin and (B) dipping the porous substrate 1 in a solution of the anionic electroconductive resin. These two operations (A) and (B) may be performed in an order of (A) to (B) or an order of (B) to (A). The resin impregnated by the dipping treatment may be dried at a stage intermediate between the two operations.

As the porous substrate, not only ordinary papers composed of cellulose fibers, such as tissue papers, art papers and base papers for copying papers, but also synthetic papers prepared by subjecting synthetic fiber staples or fibrils to the paper-making process or foaming synthetic resin films, woven and knitted fabrics prepared by weaving or knitting natural, regenerated or synthetic fibers and non-woven fabrics can be used in this invention, so far as they have a form of a porous and thin sheet allowing solutions of electroconductive resins to permeate thereinto.

In this invention, use of papers having a thickness of 30 to 100μ as the porous substrate is most preferred.

As the cationic electroconductive resin to be applied to one surface of the porous substrate and used for formation of a polysalt, there are preferably employed resinous electrolytes having a quaternary ammonium group on the main or side chain. Preferred examples of such resinous electrolytes are as follows:

(1) Resins having a quaternary ammonium group in the aliphatic main chain, such as quaternized polyethylene imines consisting of recurring units represented by the following formula:

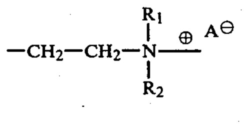

wherein $R_1$ and $R_2$ each stand for a lower alkyl group such as a methyl group, and A denotes a monovalent low-molecular-weight anion,
and ditertiary amine-dihalide condensates, e.g., ionenes.

(2) Resins containing a quaternary amino group as one member in the cyclic main chain, such as polypyrazine, quaternized polypiperazine, poly(dipyridyl) and 1,3-di-4-pyridyl propane-dihaloalkane condensates.

(3) Resins having a quaternary ammonium group on the side chain, such as poly(vinyltrimethyl ammonium chloride) and poly(allyltrimethyl ammonium chloride).

(4) Resins containing a quaternary ammonium group as the side chain on the cyclic main chain, such as resins consisting of recurring units represented by the following formula:

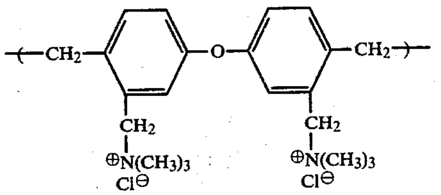

(5) Resins having a quaternary ammonium group on the cyclic side chain, such as poly(vinylbenzyltrimethyl ammonium chloride).

(6) Resins having a quaternary ammonium side chain on the acrylic skeleton, such as quaternary acrylic esters, e.g., poly(2-acryloxyethyltrimethyl ammonium chloride) and poly(2-hydroxy-3-methacryloxypropyltrimethyl ammonium chloride), and quaternary acrylamides, e.g., poly(N-acrylamidopropyl-3-trimethyl ammonium chloride).

(7) Resins having a quaternary ammonium group in the heterocyclic side chain, such as poly(N-methylvinylpyridinium chloride) and poly(N-vinyl-2,3-dimethylimidazolinuium chloride).

(8) Resins containing a quaternary ammonium group in the heterocyclic main chain, such as poly(N,N-dimethyl-3,5-methylene piperidium chloride) and copolymers thereof.

In this invention, in addition to the foregoing resins having a quaternary ammonium group on the main chain or side chain, there can be used, as cationic electroconductive resins, resins having a sulfonium group

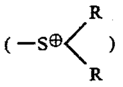

or phosphonium group

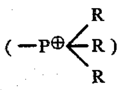

on the main or side chain, such as poly(2-acryloxyethyldimethyl sulfonium chloride) and poly(glycidyltributyl phosphonium chloride).

Since the cationic electroconductive resin to be used in this invention has on the main or side chain a highly basic group such as a quaternary ammonium group, a sulfonium group or a phosphonium group, it should naturally have a low-molecular-weight monovalent anion as the counter-ion. The surface resistance of the cationic electroconductive resin is considerably influenced by the kind of this counter-ion. As the counter-ion, there can be mentioned a chloride ion, an acetic acid ion, a nitric acid ion and a bromide ion in an order of the importance.

The cationic electroconductive resin to be used in this invention is easily soluble in water, methanol, methylcellosolve and the like, and it is applied to the porous substrate in the form of a solution in such solvent. The molecular weight of the cationic electroconductive resin is not particularly critical. The objects of this invention can be attained if only a cationic electroconductive resin having a molecular weight sufficient to form a film is used.

In this invention, it is preferred to use a cationic electroconductive resin containing quaternary ammonium group bonded to the main or side chain of the polymer at a concentration of 200 to 1000 meq, especially 400 to 1000 meq, per 100 g of the polymer.

As the anionic electroconductive resin that is applied to the other surface of the porous substrate and used for formation of a polysalt, there are employed thermoplastic resins having a carboxyl, sulfonic or phosphonic group on the side chain. Preferred examples of such cationic electroconductive resins are as follows:

(1) Electroconductive resins of the carboxylic acid type such as polyacrylic acid salts, polymethacrylic acid salts, maleic acid-acrylic acid copolymer salts and maleic acid-vinyl ether copolymer salts.

(2) Electroconductive resins of the sulfonic acid type such as polystyrene sulfonic acid salts, polyvinyltoluene sulfonic acid salts and polyvinyl sulfonic acid salts.

(3) Electroconductive resins of the phosphonic acid type such as polyvinyl phosphonic acid salts.

These anionic electroconductive resins may be used in the form of a free acid, but it is generally preferred that they be used in the form of a salt with a counter-ion consisting of a low-molecular-weight monovalent cation. As the counter-ion, there can be mentioned, for example, metals of Group I of the Periodic Table such as Na, K, Li, Rb and Cs, and ammonium and organic bases such as dimethylamine, trimethylamine, tributylamine, dimethylaniline, tetramethyl ammonium, pyridine, monoethanolamine, diethanolamine, triethanolamine and melamine. Counter-ions especially preferred for attaining the objects of this invention include alkali metals such as sodium and ammonium, and it is preferred that the anionic electroconductive resin be used in the form of a salt with a counter-ion such as mentioned above.

These anionic electroconductive resins are soluble in polar solvents such as water, methanol, methylcellosolve, dimethylformamide and dimethylsulfoxide, and they are applied to porous substrates in the form of solutions in these solvents. The molecular weight of the anionic electroconductive resin is not particularly critical in this invention, and in general, resins having a molecular weight sufficient to form a film are used in this invention.

In order to attain the objects of this invention effectively, it is preferred that an anionic electroconductive resin containing an anionic group, such as a carboxyl, sulfonic or phosphonic group, bonded to the main or side chain of the polymer at a concentration of 200 to 1200 meq, especially 400 to 1000 meq, per 100 g of the polymer be used.

In accordance with one preferred embodiment, the entire of the porous substrate is impregnated with a water-soluble inorganic salt or an organic moisture-absorbing substance, whereby the humidity dependence of the surface resistance or volume resistivity is reduced and the electric conductivity at a low humidity is remarkably improved. This water-soluble inorganic salt or organic moisture-absorbing substance may be included into the porous substrate together with the cationic or anionic electroconductive resin, but in order to further enhance the effect of preventing the tacking phenomenon, it is preferred that the water-soluble inorganic salt or organic moisture-absorbing substance be impregnated into the porous substrate prior to application of electroconductive resins.

As the inorganic water-soluble salt, there can be mentioned, for example, halides of alkali metals, alkaline earth metals, zinc, aluminum and ammonium, such as sodium chloride, potassium chloride, sodium bromide, potassium bromide, lithium bromide, calcium chloride, barium chloride, magnesium chloride, zinc chloride, aluminum chloride and ammonium chloride, nitrates and nitrites of alkali metals, alkaline earth metals, zinc, aluminum and ammonium, such as sodium nitrate, potassium nitrate, sodium nitrite, potassium nitrite, barium nitrate, magnesium nitrate, zinc nitrate, aluminum nitrate and ammonium nitrate, sulfates, sulfites and thiosulfates of alkali metals and ammonium, such as Glauber's salt, potassium sulfate, ammonium sulfate and sodium thiosulfate, carbonates and bicarbonates of alkali metals and ammonium such as sodium carbonate, potassium carbonate and ammonium carbonate, and oxyacid salts of alkali metals and ammonium, such as sodium orthophosphate and sodium metaphosphate. These inorganic salts may be used singly or in the form of mixtures of two or more of them.

Water-soluble inorganic salts preferred for attaining the objects of this invention are water-soluble inorganic salts in which the ion radius of either the anion or cation is within a range of from 0.8 to 1.5 Å and the potential product is within a range of from 0.7 to 0.4, especially from 0.09 to 0.2, and especially preferred salts are alkali metal and ammonium salts of mono-basic inorganic acids having the above characteristics.

As the organic moisture-absorbing substance, there can be mentioned, for example, water-soluble polyhydric alcohols such as glycerin, diethylene glycol, triethylene glycol, polyethylene glycol, sorbitol, mannitol, pentaerythritol, cyanized starch and polyvinyl alcohol. These organic moisture-absorbing substances can be used singly or in combination with water-soluble inorganic salts such as mentioned above.

When the porous substrate is impregnated with a water-soluble inorganic salt or an organic moisture-absorbing substance (generally a polyhydric alcohol) according to the preferred embodiment of this invention, in general, an aqueous solution of a water-soluble inorganic salt and/or an organic moisture-absorbing substance is prepared, and porous substrate is dipped in this aqueous solution, and liquid-removing and drying treatments are then conducted according to need. In general, it is preferred that the amount coated of the water-soluble inorganic salt be 1 to 15 g/m$^2$, especially 3 to 10 g/m$^2$, on the dry basis, though the preferred amount coated varies to some extent depending on the kind and thickness of the porous substrate and the kind of the water-soluble inorganic salt. When the amount coated of the water-soluble inorganic salt is larger than the above range, the tacking phenomenon becomes conspicuous in the electroconductive substrate, and when the amount coated is smaller than the above range, the improvement of the effect of reducing the humidity dependence of the electric resistance is considerably reduced as compared with the case where the salt is used in an amount within the above range. From similar viewpoints, it is preferred that the amount coated of the organic moisture-absorbing substance be within a range of 1 to 15 g/m$^2$, especially 3 to 10 g/m$^2$.

According to an embodiment of this invention, one surface of an untreated porous substrate or a porous substrate impregnated in advance with a water-soluble inorganic salt or an organic moisture-absorbing substance is coated or impregnated with a solution of a cationic electroconductive resin and the other surface of the porous substrate is coated or impregnated with an anionic electroconductive resin. These two coating or impregnation operations may be conducted separately in the above-mentioned order or the reverse order or the two coating or impregnation operations may be conducted simultaneously. Thus, an electroconductive substrate having the above-mentioned specific multi-layer novel structure is obtained.

Although the amounts coated of the cationic and anionic electroconductive resins are changed to some extent depending on the kinds of the resins and the uses of the final product, namely, an electrically responsive recording material, it is generally important that the amount coated of each resin should be 0.5 to 10 g/m$^2$, especially 1 to 7 g/m$^2$, on the dry basis. When the amount coated of the cationic or anionic electroconductive resin is smaller than the above range, the resistance of the electroconductive substrate cannot be sufficiently reduced. It is believed that the reason is that in this case it is difficult to form a polysalt in the interface between the anionic and cationic electroconductive resin layers. When the amount coated of the anionic or cationic electroconductive resin is larger than the above range, the resistance of the electroconductive substrate is, in many cases, higher than that of the electroconductive substrate in which the amount coated is within the above range. It is believed that the reason is that since the thickness of either of the cationic and anionic resin layers formed with an intermediate layer of a polysalt disposed therebetween becomes large and these two layers, especially the anionic resin layer, come to have the velocity controlling characteristic, the electric conductivity is rather reduced. In the electroconductive substrate of this invention, the amount ($D_C$) coated of the cationic electroconductive resin and the amount ($D_A$) coated of the anionic electroconductive resin may be equal or different. In general, it is preferred that the ratio ($D_C/D_A$) of the coated amounts of both the resins be within a range of from 0.4 to 2.2, especially from 0.6 to 1.5.

It is important that the cationic and anionic electroconductive resins should be coated and impregnated so that a polysalt of both the resins, namely a polymeric electrolytic complex is formed in the interface between both the resin layers. When both the cationic and anionic electroconductive resins are applied as solutions in an organic solvent such as methanol to surfaces of a porous substrate, though each of both the resin solutions readily permeates into the porous substrate, the coated porous substrate shows unexpectedly a high electric resistance (see Example 6 give hereinafter). In contrast, when the cationic and anionic electroconductive resins are applied in the form of aqueous solutions to both the surfaces of the substrate respectively, the electric resistance can be reduced to a much lower level in the coated porous subtrate. It is believed that the reason is that in an organic solvent solution, the degree of dissociation (ionization) of the cationic or anionic electroconductive resin is lower than in an aqueous solution and because of this insufficient dissociation, a strong bonded polyion complex (polysalt) is not formed in the interface between both the resin layers.

In view of the foregoing, in this invention it is preferred that at least a solution of an electroconductive resin to be applied at the final stage, especially both the solutions of cationic and anionic electroconductive resins, be an aqueous solution. As the aqueous medium, not only water but also a mixture of water with a water-miscible organic solvent such as methanol, ethanol, dimethylsulfamide, dimethylsulfoxide, acetone or the like can be used. When a mixture of water with a water-miscible organic solvent such as methanol, acetone or the like is used as the aqueous medium, the permeability of the resin solution into the porous substrate is improved and a better finish can be imparted to the coated surface. It is generally recommended to use a mixture comprising at least 10% by volume of water and up to 90% by volume of a water-miscible organic solvent.

The concentration of the electroconductive resin in the solution to be applied is selected so that good adaptability to the coating operation and sufficient permeation of the resin into the porous substrate can be attained. In general, it is preferred that the concentration of the electroconductive resin be 1 to 30% by weight, especially 5 to 15% by weight, as calculated as the solid. When a porous substrate impregnated in advance with a water-soluble inorganic or organic moisture-absorbing substance such as mentioned above is employed, in order to further improve the electric conductivity at a low humidity, it is possible to incorporate into the above resin solution a water-soluble inorganic salt such as mentioned above, especially an alkali metal or ammonium salt having a compatibility with the resin solution, or a polyhydric alcohol type organic moisture-absorbing substance. Further, in order to improve the touch, graphic property and other characteristics of the coated surface, it is possible to incorporate into the resin solution a binder such as starch, polyvinyl alcohol, a polyvinyl acetate emulsion, a synthetic rubber, a latex or the like or a filler such as titanium dioxide, finely divided silica, alumina, satin white or the like. In view of the adaptability to the coating or impregnation operation, it is preferred to adopt a method in which a solution of a cationic or anionic electroconductive resin is coated on one surface of a porous substrate, the coated surface is then dried, a solution of the other electroconductive resin is coated on the other surface of the porous substrate and the coated surface is dried to form an electroconductive substrate. When this method is adopted, it is advantageous to perform the aging treatment at a temperature of 15° to 30° C. for 0.5 to 3 hours after completion of the coating operation of the second stage, whereby formation of a polyion complex (polysalt) in the interface of both the resins is remarkably promoted and enhanced. When the above method is worked on an industrial scale, however, since the drying operation is carried out under the substantially same conditions as the above-mentioned aging conditions, the aging treatment is generally omitted. In order to promote formation of a polyion complex in the interface, it is also preferred to dry the primarily coated surface so that the water content in the primarily coated resin solution is 5 to 10% and then, apply the remaining resin solution to the other surface.

In accordance with another embodiment of this invention, as described hereinbefore by reference to FIG. 3, the operation (A) of dipping a porous substrate into a solution of a cationic electroconductive resin and the operation (B) of dipping the porous substrate into a solution of an anionic electroconductive resin are performed in an order of (A) to (B) or (B) to (A), whereby a polysalt layer extending along the entire thickness direction of the porous substrate is formed. In this embodiment, resin solutions as mentioned above can be similarly employed, and the above-mentioned polysalt-forming conditions can also be adopted. In forming a coating layer of a cationic or anionic resin on the polysalt layer, the amount coated of the resin can be reduced to such a low level as 1 to 8 $g/m^2$, especially 2 to 5 $g/m^2$, as the solid, and hence, the thickness of the coating layer can be remarkably reduced.

As will be apparent from the foregoing illustration, according to this invention, there is provided an electroconductive substrate having a novel multi-layer distribution structure comprising a lyer (a) on one surface side of the porous substrate in which a cationic electroconductive resin is predominantly distributed, a layer (b) on the other surface side of the porous substrate, in which an anionic electroconductive resin is predominantly distributed and a layer (c) of a polymeric electrolytic complex (polysalt) interposed between both the resin layers (a) and (b).

The thickness of the intermediate polysalt layer (c) can be varied in a broad range depending on the desired properties, and in general, the thickness of the polysalt may be 3 to 90%, especially 5 to 90%, of the total thickness (the total thickness of the electroconductive layer). When it is intended to obtain an electroconductive substrate having a reduced humidity dependence of the electric conductivity, it is preferred that the thickness of the polysalt layer be 40 to 90% of the total thickness, and when it is intended to obtain an electroconductive substrate excellent in the rectifying property (conductivity), it is preferred that the thickness of the polysalt layer be 5 to 50% of the total thickness. The thickness of the polysalt layer can be determined, for example, by dissolving out both the cationic and anionic electroconductive resin layers by using 95% sulfuric acid and measuring the thickness of the remaining polysalt layer.

This novel multi-layer distribution structure in the electroconductive substrate of the present invention has a novel property that the electric conductivity is especially high selectively in a specific direction, namely a rectifying propety, and it is also characterized in that the electric conductivity, especially at a low humidity, is higher than in the conventional electroconductive substrates.

Figure 12:
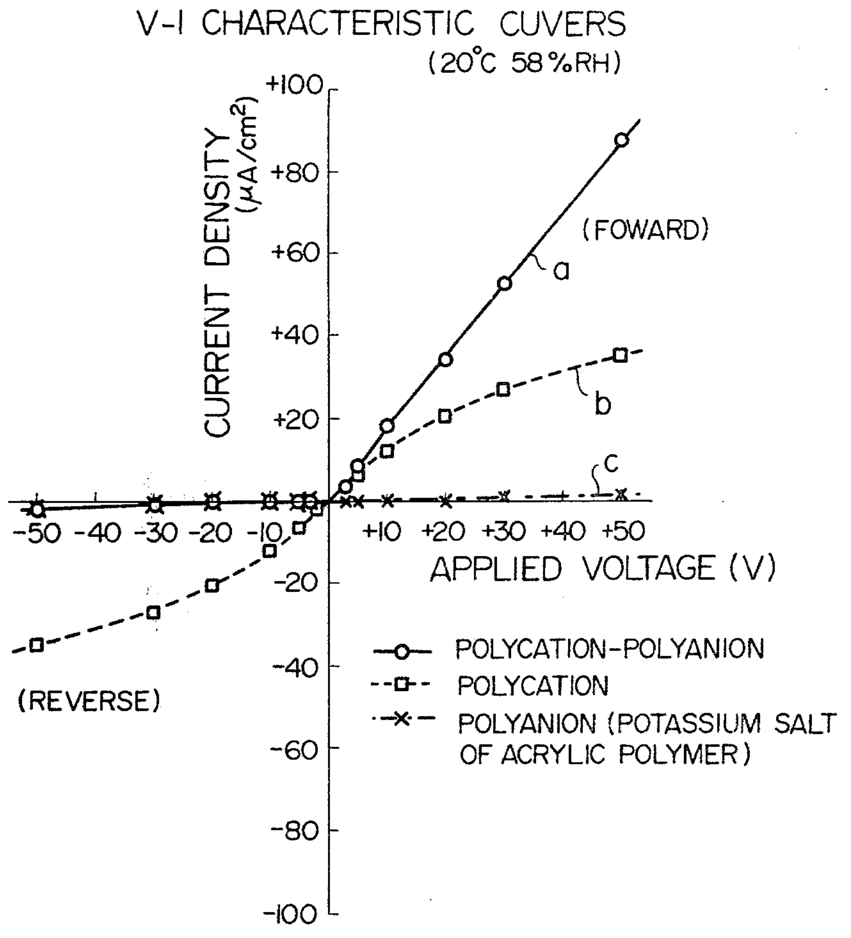
FIG. 12 is a graph illustrating the relation between the applied voltage and the current density, observed with respect to the electroconductive substrates obtained in Example 7 and Comparative Examples 1 and 2.

From FIG. 12, it will readily be understood that the electroconductive substrate of this invention has a rectifying property which is not at all observed in any of a substrate impregnated with a cationic electroconductive substance alone and a substrate impregnated with an anionic electroconductive substance alone, and that in the electroconductive substrate of this invention, the electric conductivity in a specific direction is much higher than in the above comparative substrates. This is a quite surprising fact. More specifically, in the electroconductive substrate of this invention having the above multi-layer distribution structure, it is naturally expected that the lowly conductive anionic resin layer will act as the velocity controlling layer and therefore, the electric conductivity will be lower than in the case of a cationic electroconductive layer alone.

Figure 13:
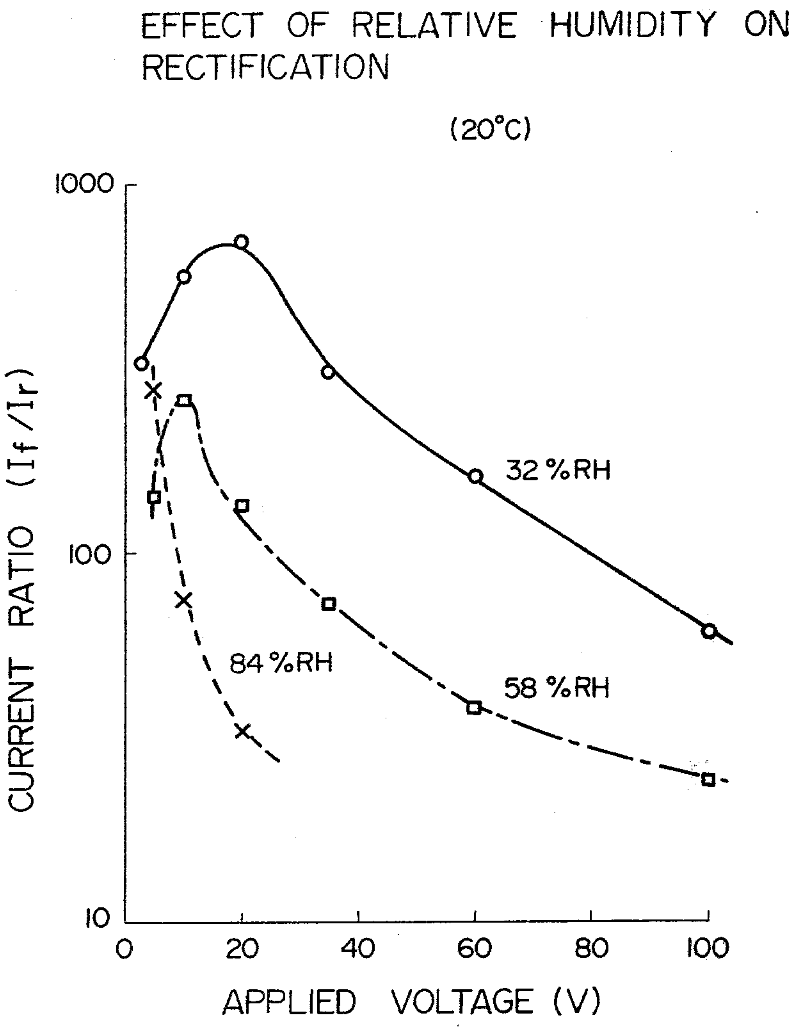
FIG. 13 is a graph illustrating the relation between the applied voltage and the rectifying property, observed with respect to the electroconductive substrate obtained in Example 7.

Referring now to FIG. 13, in the electroconductive substrate of this invention, the rectifying property ($P_R$) defined by the following formula:

$$P_R = I_F / I_R$$

wherein $I_F$ stands for an electric current obtained when the cationic resin layer connected to the anode side and the anionic resin is connected to the cathode side (forward connection) and $I_R$ stands for an electric current obtained when the connection is reversed (reverse connection), is generally at least 50, especially at least 100. Especially, the electroconductive substrate of this invention has a high rectifying property when the applied voltage is relatively low. This is another characteristic feature of the electroconductive substrate of this invention.

Figure 11:
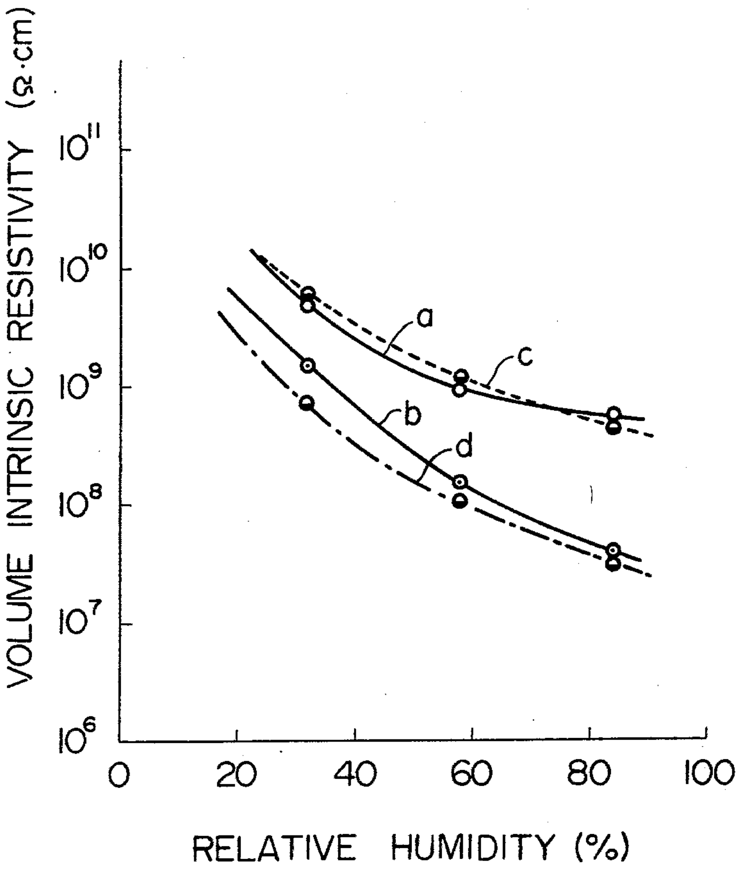
FIG. 11 is a graph showing the relation between the relative humidity and the volume intrinsic resistivity, observed with respect to the electroconductive substrates obtained according to coating methods shown in Example 2.

Referring now to FIG. 11, in the electroconductive substrate of this invention, the humidity dependence of the electric conductivity ($D_H$) defined by the following formula:

$$D_H = (\log R_1 - \log R_2)/30$$

wherein $R_1$ stands for the volume intrinsic resistivity (ohm-cm) of the electroconductive substrate at a relative humidity of 30% and $R_2$ stands for the volume intrinsic resistivity of the electroconductive substrate at a relative humidity of 60%, is not higher than 0.040, especially not higher than 0.032. The lower the value of $D_H$, the smaller is the humidity dependence of the electric conductivity.

The electric resistance (volume intrinsic resistivity) of the electrically responsive recording material of this invention can be appropriately adjusted depending on its intended use by changing the kinds of both the electroconductive resins, the combination of the two resins, the amounts coated of the two resins, the thickness of the polysalt layer and/or the kind or amount of the water-soluble inorganic salt or organic moisture-absorbing substance.

For example, when the electroconductive substrate of this invention is used as an electrolytic recording paper, the volume intrinsic resistivity is adjusted to $10^3$ to $10^8$ Ω-cm, and when the electroconductive substrate is used as an electrophotographic recording paper, the volume intrinsic resistivity is adjusted to $10^6$ to $10^{11}$ Ω-cm. Further, when the electroconductive substrate of this invention is used as an electrostatic recording paper, the volume intrinsic resistivity is adjusted to $10^5$ to $10^{10}$ Ω-cm.

In this invention, by applying a cationic resin to one surface of a porous substrate and an anionic resin to the other surface, various advantages can be attained also with respect to the production of electroconductive substrates.

For example, when anionic and cationic resins having a high electric conductivity, namely a high electrolytic property, are mixed together in a solvent, as illustrated in Example 5 given hereinafter, both the resins react with each other to form a strongly bonded polyion complex, which is readily gelled or precipitated, and therefore, it is difficult to coat or impregnate the porous substrate with such mixture. In contrast, when the two electroconductive resins are separately applied to different surfaces of the porous substrate according to this invention, an electroconductive substrate having a highly improved electric conductivity can be obtained by very simple coating or impregnation operations. This is another conspicuous advantage of this invention.

Since the electroconductive substrate of this invention has a low electric resistance and a high electric conductivity at a low humidity, it can be effectively applied to various electrically responsive recording materials. Especially good results are obtained when the electroconductive substrate of this invention is applied to electrolytic recording materials.

Electrolytic recording materials are divided into 4 types by the above-mentioned 4 kinds of the coloration mechanisms (a) to (d). The electroconductive substrate of this invention can be effectively applied equally to all of these 4 types of electrolytic recording materials. Suitable color formers selected depending on the kind of the coloration mechanism are incorporated into the cationic electroconductive resin layer and/or the anionic electroconductive resin layer of the electroconductive substrate of this invention.

Typical instances of application of the electroconductive substate of this invention to the electrolytic recording process will now be described in detail.

(a) Electrolytic Recording Material for Coloration Mechanism Utilizing Introduction of Different Ions (1) A metal needle as anode is dissolved out in the form of a cation into the electroconductive substrate by electrode reaction, and it reacts with a color former contained in the electroconductive substrate, which consists of a chelating agent, to form a color image of a chelate compound.

(2) A metal needle as anode is dissolved out in the form of a cation into the electroconductive substrate by electrode reaction and is reduced by a reducing agent contained in the electroconductive substrate to form an image of fine metal particles.

(3) A needle of a metal such as tellurium as cathode is dissolved out in the form of an anion into the electroconductive substrate by electrode reaction and the formed compound is subsequently decomposed to form an image of fine metal particles.

Typical instances of combinations of metal electrodes and color formers to be used in the color formation mechanism (a) are as shown in Table 1.

Table 1

| Metal Electrode and Polarity | Color Former | Coloring Substance and Color Thereof | Type |
|---|---|---|---|
| Fe, anode | sodium diethyldithiocarbamate | chelate compound, violet | (1) |
| Fe, anode | potassium ferrocyanide | complex compound, blue | (1) |
| Fe, anode | tannic acid | chelate compound, violet | (1) |
| Fe, anode | catechol | chelate compound, black | (1) |
| Cu, anode | rubeanic acid | chelate compound, greenich black | (1) |
| Ag, anode | formaldehyde sulfoxylate | reduction product of Ag ion (metallic silver), black | (2) |
| Te, cathode | sodium chloride | Te simple substance formed by decomposition of $Na_2Te$ | (3) |

Table 1-continued

| Metal Electrode and Polarity | Color Former | Coloring Substance and Color Thereof | Type |
|---|---|---|---|
| | | and $H_2Te$, black | |

As other examples of combinations of metals and color formers (chelating agents) belonging to the type (1), the following can be mentioned:

Ag: polyhydric phenol compounds, galloylgallic acid, chromotropic acid

Fe:, b 2,2',2"-terpyridine, nitroso R salt, hydroquinone, benzoylpyridine oxime

Cu: sodium ethylenediamine tetraacetate, rubeanic acid, sodium diethyldithiocarbamate, neocuproine Ni: sodium diethyldithiocarbamate, nitroso R salt The color former may be made present in the entire of the substrate of the electrolytic recording material, but in general, when an image is formed on the anode side, the color former is incorporated only in the cationic electroconductive resin layer, and when an image is formed on the cathode side, the color former is incorporated only in the anionic electroconductive resin layer. The color former is incorporated in the anionic or cationic electroconductive resin layer in an amount sufficient to form an image having a good contrast.

In electrolytic recording materials utilizing the coloration mechanism (a), it is generally desirable to incorporate the above-mentioned water-soluble inorganic salt, for example, sodium chloride, ammonium chloride, ammonium nitrate and alkali metal nitrates. Furthermore, it is also possible to incorporate stabilizers such as thiourea and alkyl derivatives thereof, oxidizers such as alkali metal chlorates and perchlorates and acidifying agents such as formic acid, citric acid, oxalic acid and hydrochloric acid according to known recipes.

(b) Electrolytic Recording Material for Coloration Mechanism Utilizing Discharge of Ions from Electrode Falling in Contact with Recording Material A typical instance of this type is as follows:

| Polarity of Metal Needle Electrode | Color Former | Coloring Substance and Color Thereof |
|---|---|---|
| anode | potassium iodide and starch | iodine-starch reaction product, deep blue |

Also in the electrolytic recording material of this type, the color former may be incorporated into the entire of the electroconductive substrate or only in the cationic electroconductive resin layer. Since a higher sensitivity is obtained under an acidic condition, an acidifying agent may be incorporated together with the color former.

(c) Electrolytic Recording Material for Coloration Mechanism Utilizing Oxidation or Reduction On Surface of Electrode Falling in Contact with Recording Material Suitable examples are as follows:

| Polarity of Metal Needle Electrode | Color Former | Coloring Substance and Color Thereof |
|---|---|---|
| [oxidation type] anode | Leuco Crystal Violet | Crystal Violet, violet |
| [reduction type] cathode | 2,3,5-triphenyl-tetrazonium chloride | formazan dye, red |

As the color former of the oxidation type, in addition to the above compound, there can be used various leuco dyes, such as Leucoethyl Nile Blue (blue), Leucomethyl Capryl Blue (blue), Leuco Toluine Blue (violet), leucodiphenylamine (violet), leuco-N-methyldiphenylamine-p-sulfonic acid (reddish violet), leucophenylanthranylic acid (reddish violet), methylviologen (violet), Leuco Safranine T (red), leuco-indigo-sulfonic acid (blue), leucophenosafranine (red), Leucomethylene Blue (blue), leucodiphenyl benzidine, Leuco Auramine (yellow), Benzoyl Leucomethylene Blue (blue), Leuco Erioglaucine A (yellowish green to red), leuco-p-nitrodiphenylamine (violet) and leuco-diphenylamine-O,O'-diphenylcarboxylic acid (bluish violet).

These leuco dyes are stable under alkaline conditions but unstable under acidic conditions. Accordingly, it is preferred to use these leuco dyes in combination with alkaline buffer agents such as formates, acetates, carbonates, tartarates, bicarbonates, borates and phosphates of alkali metals and alkaline earth metals. The color former of this type may be incorporated into the entire of the electroconductive substrate or the cationic electroconductive resin layer alone.

As the color former of the reduction type, in addition to 2,3,5-triphenyltetrazolium chloride, there can be employed, for example, Tetrazonium Blue, Tetrazonium Purple, Tetrazonium Violet, 2,5-diphenyl-3-(4-styrylphenyl)tetrazonium chloride and the like. These tetrazonium salts may be incorporated into the entire of the electroconductive substrate or into the anionic electroconductive resin layer alone. In each case, in order to improve the contrast of the resulting image, it is possible to incorporate a white inorganic filler.

(d) Electrolytic Recording Material for Coloration Mechanism Utilizing Local Change of pH on Surface of Electrode Falling in Contact with Recording Material Suitable examples are shown in Table 2.

Table 2

| Polarity of Metal Needle Electrode | Color Former | Coloring Substance and Color Thereof |
|---|---|---|
| cathode | diazonium salt | dimer of diazonium salt decomposition product, orange to black |
| cathode | aromatic primary amine, coupling component and alkali metal nitrate conductive electrolyte | formed azo dye, blackish brown |

As the diazonium salt, there can be employed diazonium salts customarily used in ordinary diazo type reproduction process, for example, p-N,N-dimethylaminobenzene diazonium chloride/zinc chloride double salt, 4-morpholinobenzene diazonium chloride/zinc chloride double salt, and p-N,N-diethylamino-2,5-dimethoxybenzene diazonium chloride/zinc chloride double salt. These diazonium salts may be used in combination with known stabilizers such as tartaric acid and citric acid.

As the aromatic primary amine mentioned as one component of the latter color former in Table 2, there can be used amines customarily employed for synthesis of diazonium compounds for diazo type reproduction, such as aniline, morpholine and N,N-di-substituted-p-phenylene diamines. These amines are usually employed in the form of hydrochlorides. As the coupling component, there can be used phenol derivatives, hydroxynaphthalene derivatives and active methylene-containing compounds. In order to prevent pre-coupling, acidifying agents such as mentioned above may be used in combination with the color former-constituting components.

The diazonium salt or azo dye-forming components may be incorporated in the entire of the electroconductive substrate or in the anionic electroconductive resin layer alone. In this case, it is preferred that a resin of the strong acid type or sulfonic acid type be used as the anionic electroconductive resin.

These four kinds of electrolytic recording materials can be applied to various uses according to known electrolytic recording processes corresponding to the respective coloration mechanisms.

Figure 4:
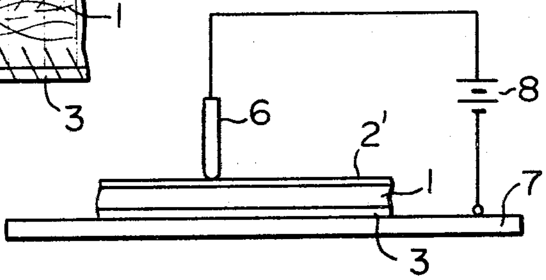
FIGS. 4, 5, 6 and 7 are diagrams illustrating various modifications of the electrolytic recording process using the electrically responsive recording material of this invention.

An embodiment of the electrolytic recording process using the recording material of this invention will now be described by reference to FIG. 4. Referring now to FIG. 4, a metal needle 6 (recording electrode) as the anode and an electrode plate 7 (cathode) are connected to a recording signal output device 8. An electrically responsive recording material is located so that both the surfaces of the recording material are contacted with the anode 6 and electrode plate 7, respectively. As shown in FIG. 4, this electrically responsive recording material comprises a cationic electroconductive resin surface layer 2′ (recording layer) containing a color former, a porous substrate 1 and an anionic electroconductive resin layer 3.

According to this invention, this recording layer 2′ contains a chelating agent or reducing agent capable of reacting with a cation of the metal as the anode to form a visible image or a color former forming a visible image by anodic oxidation, such as a leuco dye.

In the recording process shown in FIG. 4, an electric circuit is formed through the anode 6, the recording layer 2′, the porous substrate 1, the anionic electroconductive resin layer 3 and the electrode plate 7, and in response to the recording current, a visible image is formed on the recording layer 2′ to effect recording.

Figure 5:
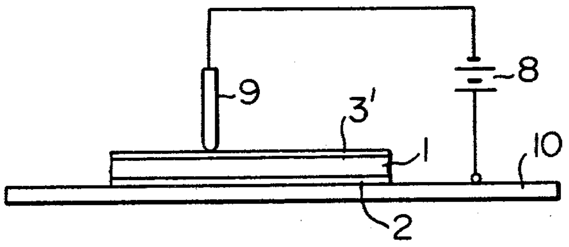

In the recording process shown in FIG. 5, a metal needle 9 and an electrode plate 10 are connected to a recording signal output device 8 so that the metal needle 9 acts as the cathode and the electrode plate 10 acts as the errode. In this embodiment, an electrically responsive recording material is disposed so that an anionic electroconductive resin layer 3′ (recording layer) containing a color former is present in the surface portion facing the cathode 9 and a cationic electroconductive resin layer 2 is present in the surface portion facing the electrode plate 10.

According to this invention, the recording layer 3′ contains a tetrazonium salt forming a visible image by cathodic reaction, a compound forming azo dye by decomposition in the vicinity of the cathode or other color former such as a diazonium salt. An electric circuit is formed through the cathode 9, the recording layer 3′, the porous substrate 1, the cationic electroconductive resin layer 2 and the electrode plate 10, and in response to the recording current, a visible image is formed on the recording layer 3′ to effect recording.

Figure 6:
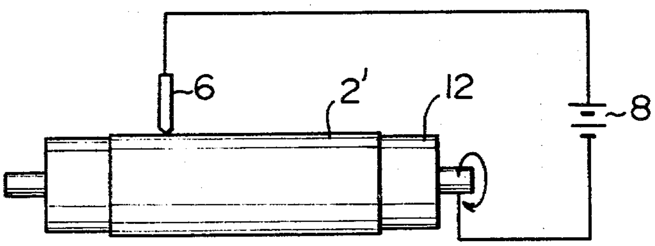

FIG. 6 illustrates the cylinder scanning recording process as an instance of the electrolytic scanning recording process. A recording needle electrode 6 and a conductive drum 12 are connected to a recording signal output device 8 so that the needle electrode 6 acts as the anode and the drum 12 acts as the cathode. In this embodiment, the electrically responsive recording material is disposed so that a cationic electroconductive resin layer 2′ (recording layer) containing a color former is present in the surface portion facing the anode 6 and an anionic electroconductive resin layer is present in the state contacted with the drum 12 as the cathode. However, if the needle electrode is used as the cathode in this arrangement, the anionic electroconductive resin layer is located as the recording layer and the cationic electroconductive resin layer is disposed so that it is contacted with the drum as the anode.

Figure 7:
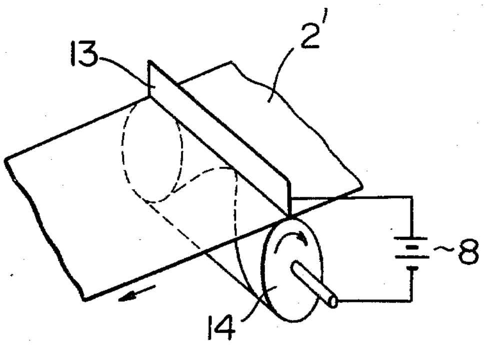

FIG. 7 illustrates the plane scanning recording process as another instance of the electrolytic scanning recording process. In this embodiment, a recording linear electrode 13 as the anode and a helical electrode 14 as the cathode are connected to a recording signal output device 8. An electrically responsive recording material is disposed so that a cationic electroconductive resin layer 2′ as the recording layer is present in the surface portion facing the anode 13 and an anionic electroconductive resin layer is contacted with the helical electrode 14 as the cathode.

The electroconductive substrate of this invention can also be used as an electroconductive substrate of an electrophotographic recording material. In this case, a known photoconductive layer is formed on the electroconductive substrate of this invention. If the photoconductor used is one suitable for negative charging, for example, zinc oxide, the photoconductive layer is formed on the cationic electroconductive resin-coated surface. On the other hand, if the photoconductor used is one suitable for positive charging, such as polyvinyl carbazole, the photoconductive layer is formed on the anionic electroconductive resin-coated surface. If this arrangement is adopted, better results are obtained with respect to the charging characteristics described below.

For formation of the photoconductive layer, there are employed inorganic photoconductors such as photoconductive zinc oxide and photoconductive titanium oxide and organic photoconductors such as polyvinyl carbazole, which may be, if desired, dispersed in resin binders having an electrically insulating property (having a volume intrinsic resistivity higher than $10\times10^{14}$Ω-cm), for example, hydrocarbon homopolymers and copolymers such as polyolefins, polystyrene and styrene-butadiene copolymers, vinyl homopolymers and copolymers such as polyacrylic acid esters and vinyl acetate-vinyl chloride copolymers, alkyd resins, melamine resins and epoxy resins. Combinations and recipes of these photoconductors and binder resins are well-known to those skilled in the art, and any of these known combinations and recipes can be used in this invention.

A typical instance of the coating composition for formation of a photoconductive layer, which is preferably applied to the electroconductive substrate of this invention, is as follows:

| | |
|---|---|
| Photoconductor | 100 parts by weight |
| Electrically insulating binder resin | 15-25 parts by weight |
| Photosensitizer | $5 \times 10^{-3}$-$5 \times 10^{-2}$ parts by weight |
| Solvent | 50-100 parts by weight |

The photoconductive layer-forming coating composition is dissolved or dispersed in an aromatic solvent such as benzene, toluene and xylene and the solution or dispersion is applied to the electroconductive resin surface of the electroconductive substrate in an amount of 20 to 30 g/m$^2$ as the solid.

When the electroconductive substrate of this invention is applied to an electrophotographic recording material, in addition to the foregoing advantages, there can be attained various advantages effective for performing the electrophotographic recording. For example, as illustrated in Examples G and H given hereinafter, the electrophotographic recording material including the electroconductive substrate of this invention has much higher initial potential, dark decay residual ratio and sensitivity than those of the recording material including a known electroconductive substrate. Accordingly, if the electrophotographic recording material according to this invention is used, electrophotographic prints having high contrast and concentration can be obtained.

Figure 8:
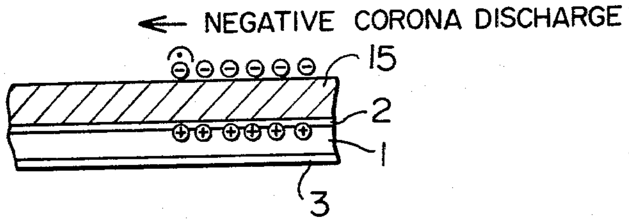
FIG. 8 is a diagram illustrating the electrophotographic recording process using the electrically responsive recording material of this invention.

FIG. 8 illustrates an embodiment in which this invention is applied to an electrophotographic photosensitive paper. Referring now to FIG. 8, in a electrophotographic sensitive paper to be subjected to negative corona discharge, a photoconductive layer 15 is formed on a cationic electroconductive resin layer 2 formed in one surface portion of a support 1, and an anionic electroconductive resin layer is formed in the other surface portion of the support 1. In the case of positive corona discharge, the photoconductive layer 15 is formed on the anionic electroconductive resin layer, and the cationic electroconductive resin layer is formed in the other surface portion of the support 1.

Then, the photoconductive layer charged with a certain polarity is exposed to an actinic ray pattern to form an electrostatic latent image, and the electrostatic latent image is contacted with a toner charged with the reverse polarity directly or after transfer to other substrate to thereby form a visible toner image.

Still further, the electroconductive substrate of this invention can be used as an electroconductive substrate of an electrostatic recording material. In this case, a dielectric layer is formed on the electroconductive substrate of this invention having the abovementioned novel multi-layer distribution structure. It is preferred that when the electrostatic recording is conducted with charges of the positive polarity, the dielectric layer be formed on the cationic resin-coated surface, and that when the electrostatic recording is conducted with charges of the negative polarity, the dielectric layer be formed on the anionic resin-coated surface.

For formation of the dielectric layer, there are employed, in an order of the importance, a vinyl chloride-vinyl acetate copolymer, a methacrylic resin, a vinyl ether resin and a vinyl acetate-crotonic acid resin. These substances are coated in the form of a solution in tetrahydrofuran, methylethyl ketone or an aromatic hydrocarbon solvent in a dry thickness of 7 to 15μ.

Figure 9:
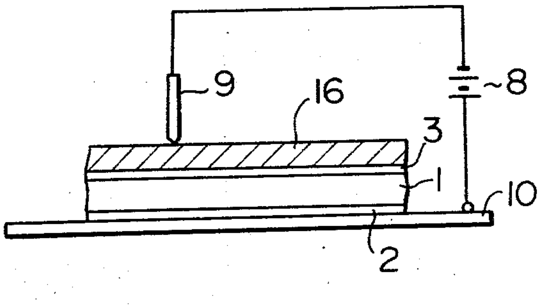
FIG. 9 is a diagram illustrating the electrostatic recording process using the electrically recording material of this invention.

FIG. 9 illustrates an embodiment in which this invention is applied to an electrostatic recording paper. When the recording is conducted under application of a negative voltage, a dielectric layer 16 is formed on an anionic electroconductive resin layer 3 formed in one surface portion of a support 1 and a cationic electroconductive resin layer 2 is formed in the other surface portion of the support 1. In case a positive voltage is applied for recording, the dielectric layer 16 is formed on the cationic electroconductive resin layer.

An electrostatic latent image is formed on the dielectric layer 16, and it is contacted with a toner charged with a polarity reverse to that of the electrostatic latent image, to thereby form a visible toner image.

This invention will now be described by reference to the following Examples that by no means limit the scope of the invention.

EXAMPLE 1

Figure 10:
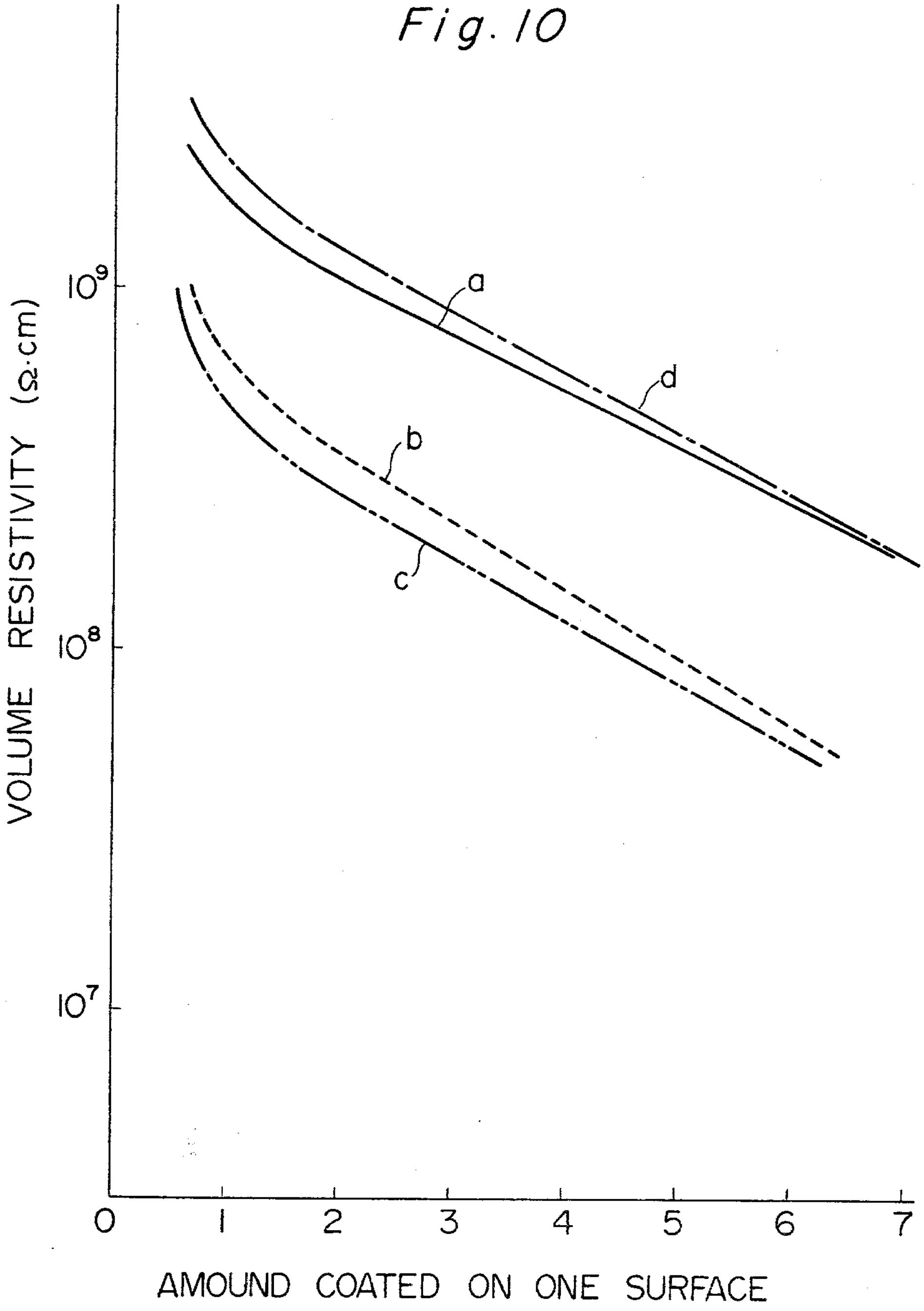
FIG. 10 is a graph illustrating the relation between the amount coated of the conductive resin and the volume intrinsic resistivity, observed with respect to the electroconductive substrates obtained according to coating methods shown in Example 1.

A cationic electroconductive resin (ECR-34 manufactured by Dow Chemical) and an anionic electroconductive resin (Oligo-Z manufactured by Tomoegawa Seishi) are coated, each being in the form of an aqueous solution having a concentration of 5 to 15% by weight, on both the surfaces of high quality paper having a thickness of 90μ by using a wire bar, and the volume intrinsic resistivity per unit amount coated (g/m$^2$) is determined to obtain results shown in FIG. 10. The measurement is conducted after drying has been conducted at 80° C. for 5 to 6 minutes and the sample has been allowed to stand still for 48 hours in an atmosphere having a relative humidity of 60%. Samples formed by coating both the surfaces with the same resin and samples formed by coating the two surfaces with ECR-34 and Oligo-Z, respectively, are tested. The measurement is carried out with respect to both the forward and reverse connection. Namely, the following 4 arrangements are adopted:

| | | | Sample | |
|---|---|---|---|---|
| | cationic face-cationic face | | b | |
| main electrode (positive) | anionic face-anionic face | counter electrode (negative) | a | |
| | cationic face-anionic face | | c | (forward) |
| main electrode (negative) | cationic face-anionic face | counter electrode (positive) | d | (reverse) |

In conducting the measurement, a voltage of 10 V is applied for 60 seconds and at this point a value of the electric current (substantially constant state electric current) is measured and used for calculation. In order to improve the measurement accuracy, a circular electrode provided with a guard electrode is used for the measurement. The relation between the amount coated and the volume intrinsic resistivity is as shown in FIG. 10.

When the polarity of the electrode is made in agreement with the charge polarity of the electroconductive resin (forward connection), reduction of the resistivity is observed. In FIG. 10, curves a and b show results obtained with respect to samples a and b having both the surfaces coated with the same resin (Oligo-Z or ECR-34), and curves c and d show results obtained with respect to samples c and d having the two surfaces coated with different resins (Oligo-Z and ECR-34), respectively. In sample c, the cationic face (ECR-34) is disposed on the side confronting to the main electrode as the anode (forward direction), and in sample d, the cationic face (ECR-34) is disposed on the side confronting to the main electrode as the cathode (reverse connection).

EXAMPLE 2

High quality paper is dipped in a 5% by weight solution of a cationic electroconductive resin (ECR-34) in 1 l of a 1:1 mixed solvent of water and methanol containing 30 ml of glycerin, followed by air drying, and the paper is dipped in a similarly prepared solution of an anionic electroconductive resin (Oligo-Z), followed by drying. In the paper substrate, a polysalt is formed in an amount of about 3.2 $g/m^2$ throughout the structure by the above dipping treatment.

So treated paper substrates are coated with 10% by weight aqueous solutions of the electroconductive resins in amounts coated of about 3 $g/m^2$ as shown in Table 3 below. So prepared samples are allowed to stand still for 48 hours in an atmosphere having a relative humidity of 30%, 60% and 84%, respectively, and the volume intrinsic resistivity is measured with respect to each sample to obtain results shown in FIG. 11.

Table 3

| Sample | Face Confronting to Main Electrode (positive electrode) | Face Confronting to Counter Electrode (negative electrode) | Connection |
|---|---|---|---|
| a | Oligo-Z | Oligo-Z | |
| b | ECR-34 | ECR-34 | |
| c | Oligo-Z | ECR-34 | reverse |
| d | ECR-34 | Oligo-Z | forward |

As will be apparent from the results shown in FIG. 11, when the polarity of the electrode is made in agreement with the charge polarity of the resin, the electric resistance is reduced and also the humidity dependence of the electric resistance, i.e., the electric conductivity, is reduced.

EXAMPLE 3

A 10% by weight methanol solution (soluble in methanol but insoluble in water) of a cationic electroconductive resin (Elecond PQ-50B manufactured by Soken Chemical) and a 10% by weight aqueous solution of an anionic electroconductive resin (Elecond PQ-A3 manufactured by Soken Chemical) are coated on high quality paper substrates in amounts coated of 3 to 3.5 $g/m^2$ on one surface. The wire side of each sample is connected to the main electrode (anode) and the volume intrinsic resistivity is measured in the same manner as in the preceding Examples, to obtain results shown in Table 4.

Table 4

| High Quality Paper Substrate | | Volume Intrinsic Resistivity (Ωcm) (as measured |
|---|---|---|
| Wire Side | Felt Side | at 30% RH) |
| PQ-50B | PQ-50B | $4.3 \times 10^{11}$ |
| PQ-A3 | PQ-A3 | $2.7 \times 10^{12}$ |
| PQ-50B | PQ-A3 | $9.1 \times 10^{10}$ |

For reference, when the polarity of the main electrode is made in reverse to the charge polarity of the electroconductive resin, the volume intrinsic resistivity is $1.1 \times 10^{12}$Ω-cm.

EXAMPLE 4

High quality paper is impregnated with a 10% by weight aqueous solution of ammonium chloride and air-dried at 80° C. for 5 minutes. Then, both the surfaces of the paper are coated with 10% by weight aqueous solutions of ECR-34 (cationic electroconductive resin) and Oligo-Z (anionic electroconductive resin), respectively, in cation-cation and cation-anion combinations and then dried, So obtained samples are allowed to stand still for 48 hours in an atmosphere of a relative humidity of 30 or 60%. The cationic face is contacted with the main electrode as the positive electrode and the volume intrinsic resistivity is measured to obtain results shown in Table 5.

Table 5

| Combination | Volume Intrinsic Resistivity (Ω-cm) | |
|---|---|---|
| of Resins | 30% RH | 60% RH |
| ECR-34/ECR-34 | $6.8 \times 10^8$ (water content = 3.8g/$m^2$) | $5.5 \times 10^7$ (water content = 5.9 g/$m^2$) |
| ECR-34/Oligo-Z | $9.3 \times 10^7$ (water content = 3.7g/$m^2$) | $9.3 \times 10^6$ (water content = 5.8 g/$m^2$) |

From the above results, it will readily be understood that when the polarity of the electrode is made in agreement with the charge polarity, the electric resistance and its himidity dependence can be reduced.

EXAMPLE 5

Both the resin solutions used in Example 4 are mixed together. Since the mixture becomes turbid and white precipitates are formed, coating operation is impossible with this mixture.

EXAMPLE 6

Procedures of Example 4 are repeated in the same manner except that both the resins are applied in the form of a 10% by weight solution in methanol. After samples have been allowed to stand still for 48 hours in an atmosphere of a relative humidity of 30 or 60%, the volume intrinsic resistivity is measured to obtain results shown in Table 6.

Table 6

| Resin | Volume Intrinsic Resistivity (Ω-cm) | |
|---|---|---|
| Combination | 30% RH | 60% RH |
| ECR-34/ECR-34 | $1.7 \times 10^9$ (water content = 4.09g/$m^2$) | $2.0 \times 10^8$ (water content = 6.0 g/$m^2$) |
| ECR-34/0ligo-Z | $2.0 \times 10^6$ (water content = 3.9g/$m^2$) | $8.4 \times 10^7$ (water content = 5.8 g/$m^2$) |

As will be apparent from the above results, when methanol is used as a solvent, the resistivity is higher by one figure than when water is used (Example 4), though the water content is maintained at the same level.

EXAMPLE 7 AND COMPARATIVE EXAMPLES 1 AND 2

One surface of high quality paper is coated with a 10% by weight aqueous solution of a cationic electroconductive resin (ECR-34) and the other surface is coated with a 10% by weight aqueous solution of an anionic electroconductive resin (Elecond PQ-A), followed by drying. The amount coated of each resin is 4.5 $g/m^2$. The voltage-current curve is obtained under conditions of a temperature of 20° C. and a relative humidity of 58% to obtain results shown in FIG. 12. For comparison, the cationic electroconductive resin alone is coated on both the surfaces (Comparative Example 1) and the anionic electroconductive resin alone is coated on both the surfaces (Comparative Example 2). Results obtained with respect to these comparative samples are also shown in FIG. 12. In FIG. 12, curve a shows results of Example 7, curve b shows results of Comparative Example 1, and curve c shows results of Comparative Example 2.

From the results shown in FIG. 12, it will readily be understood that the electroconductive substrate of this invention has a typical rectifying property.

EXAMPLE A

High quality paper having a thickness of 90μ is dipped in a 10% by weight aqueous solution of sodium nitrate and dried at 80° C. for 5 minute. A recording layer is formed on the wire side surface by using a color former-containing cationic electroconductive resin having the composition shown below (an amount coated of 14 $g/m^2$ on the dry base), and the felt side surface is coated with an aqueous solution of an anionic electroconductive resin (Oligo-Z) and dried at 80° C. for 5 minutes (an amount coated of 3.3 $g/m^2$ on the dry basis), to thereby form a recording paper.

| Coating Composition for Formation of Recording Layer: | |
|---|---|
| titanium oxide | 6 parts by weight |
| ECR-34 (33.5% aqueous solution) | 18 parts by weight |
| sodium nitrate | 1.3 parts by weight |
| Benzoyl Leucomethylene Blue | 1.5 parts by weight |
| methanol | 20 parts by weight |
| 1% by weight aqueous solution of sodium hydroxide | 10 parts by weight |

A mixture of the above composition is dispersed for 10 hours in a ball mill to form a coating composition. The anionic electroconductive resin is diluted with a 1% by weight aqueous solution of sodium hydroxide and is used in the form of a 10% by weight aqueous solution.

For comparison, the felt side surface is coated with a 10% by weight aqueous solution of ECR-34 (prepared by using a 1% by weight aqueous solution of sodium hydroxide).

The so prepared recording paper is attached to a metal drum and a direct current voltage of 300 V is applied by using a needle electrode (stainless steel) as the anode and the drum as the cathode. Recording is conducted at a relative humidity of 60% and a recording speed of 50 cm/sec. The reflection density is 0.3 in the case of the recording paper of this invention, while the reflection density is 0.2 in the case of the comparative sample.

EXAMPLE B

In the same manner as described in Example A, a recording layer is prepared by using the following coating compositions for formation of recording and conductive layers.

| Composition for Formation of Recording Layer (wire side): | |
|---|---|
| ECR-34 | 18 parts by weight |
| sodium nitrate | 1.0 parts by weight |
| Leuco Crystal Violet | 1.5 parts by weight |
| methanol | 20 parts by weight |
| 1% by weight aqueous solution of sodium hydroxide | 10 parts by weight |

| Coating Composition for Conductive Layer (felt side): | |
|---|---|
| this invention: | 10% by weight aqueous solution of an anionic electroconductive resin (PQ-A manufactured by Soken Chemical) |
| comparison: | 10% by weight aqueous solution of a cationic electroconductive resin (ECR-34) |

Recording is conducted under the same conditions as in Example A. In the case of the recording paper of this invention, the reflection density is 0.45, while in the case of the comparative sample the reflection density is 0.3.

EXAMPLE C

| Coating Composition for Formation of Recording Layer (wire side): | |
|---|---|
| this invention: | 2 parts by weight of 2,3,5-triphenyltetrazolium chloride (hereinafter referred to as "TTC") is dissolved in 100 parts by weight of a 10% by weight aqueous solution of an anionic electroconductive resin (Oligo-Z). |
| comparison: | 2 parts by weight of TTC is dissolved in 100 parts by weight of a 10% by weight aqueous solution of a cationic electroconductive resin (ECR-34). |

| Coating Composition for Formation of Conductive Layer (felt side): |
|---|
| A 10% by weight solution of a cationic electroconductive resin (PQ-10W manufactured by Soken Chemical) in a 6:4 mixed solvent of water and methanol. |

The above coating compositions are coated on respective surfaces of high quality paper having a thickness of 90μ by means of a wire bar and the coated paper is dried at 80° C. for 5 minutes. The so prepared recording paper is allowed to stand still in an atmosphere of a relative humidity of about 50% for 2 hours and attached to a metal drum. A direct current voltage of 300 V is applied by using a needle electrode as the cathode and the drum as the anode, and recording is conducted at a recording speed of 50 cm/sec. In the case of the recording paper of this invention, the reflection density is 0.25, while in the case of the comparative sample the reflection density is 0.13.

EXAMPLE D

High quality paper is dipped in a 3% by weight aqueous solution of glycerin and dried at 80° C. for 5 minutes. The wire side face of the paper is coated with the following coating composition and dried;

| | |
|---|---|
| 10% by weight aqueous solution of PQ-10W (cationic electroconductive resin) | 10 parts by weight |
| 1-formyl-4-methylthiosemicarbazide | 0.5 part by weight |
| sodium chloride | 5 parts by weight |
| methanol | 2 parts by weight |
| water | 20 parts by weight |

Then, the felt side face of the paper is coated with a 10% by weight solution of an anionic electroconductive resin (PQ-A) in a 1:1 mixed solvent of water and methanol (this invention) or a 10% by weight solution of a cationic electroconductive resin (Chemistat 6200 manufactured by Sanyo Kasei) in a 1:1 mixed solvent of water and methanol (comparison), and the coated paper is dried at room temperature. The water content is about 10%. The so prepared recording paper is subjected to recording in the same manner as in Example A under a recording voltage of 100 V by using an iron needle electrode. In the case of the recording paper of this invention, the reflection density is 0.8, while in the case of the comparative sample the reflection density is 0.57.

EXAMPLE E

The wire side face of the same high quality paper as used in Example D is coated with the following coating composition and dried:

| | |
|---|---|
| 10% by weight aqueous solution of cationic electroconductive resin (CP-261 manufactured by Cargon Co.) | 10 parts by weight |
| rubeanic acid | 0.55 |
| ammonium chloride | 3 |
| ethanol | 7 |
| water | 13 |

The felt side face of the paper is then coated with the same electroconductive resin solution as used in Example D (the solution of this invention or the comparative solution) and the coated paper is dried at room temperature. The water content is about 10%. In the same manner as in Example D, the recording paper is subjected to recording by using a copper needle electrode. In the case of the recording paper of this invention, the reflection density is 0.7, while in the case of the comparative sample the reflection density is 0.5.

EXAMPLE F

High quality paper is dipped in a 3% by weight aqueous solution for polyethylene glycol and dried at 80° C. for 5 minutes. The wire side face of the paper is coated with the following coating composition and dried;

| | |
|---|---|
| 10% by weight aqueous solution of Chemistat 6200 (cationic electroconductive resin) | 10 parts by weight |
| sodium formaldehyde sulfoxylate | 2.3 |
| sodium formate | 0.45 |
| potasium nitrate | 0.2 |
| water | 20 |

The felt side face of the paper is then coated with the same electroconductive resin solution as used in Example D (the solution of this invention or the comparative solution) and the coated paper is dried at room temperature. The water content is about 10%. In the same manner as in Example D, the recording paper is subjected to recording by using a silver needle electrode. In the case of the recording paper of this invention, the reflection density is 0.82, while in the case of the comparative sample the reflection density is 0.63.

EXAMPLE G

The following components are pulverized for 6 hours in a ball mill, and the resulting composition is coated on the wire side face of a support described below, followed by drying, to obtain an electrophotographic sensitive paper. The amount coated is about 30 g.

| Coating Composition: | |
|---|---|
| zinc oxide | 10 parts by weight |
| acrylic resin (Acrydic A-458 manufactured by Dainippon Ink; solid content = 50%) | 3 parts by weight |
| acrylic resin (Acrydic A-452) | 1 part by weight |
| Rose Bengale (solution of 100 mg in 50 ml of methanol | 1 part by weight |
| toluene | 10 parts by weight |

The support is one prepared by coating 10% by weight aqueous solutions of a cationic electroconductive resin (ECR-34) and an anionic electroconductive resin (Oligo-Z) on surfaces of high quality paper having a thickness of 90μ in an amount coated of about 3.5 $g/m^2$ on one surface (on the dry basis). The above photosensitive coating composition is applied on the wire side face of the so coated paper. Combinations of the resins coated on the high quality paper are as follows:

| Sample No. | Wire Side | Felt Side |
|---|---|---|
| 1 | ECR-34 | ECR-34 |
| 2 | ECR-34 | Oligo-Z |
| 3 | Oligo-Z | ECR-34 |
| 4 | Oligo-Z | Oligo-Z |

The so prepared photosensitive papers are allowed to stand still in the dark at room temperature and normal humidity overnight, and their charge characteristics are determined by a surface potential meter, Model SP-428 manufactured by Kawaguchi Denki (the dynamic system; ±5 KV is applied for 5 seconds, and after 40 seconds' dark decay, the sample is exposed to 20 luxes), to obtain results shown in Table 7.

Table 7

| | Negative Charge | | | Positive Charge | | |
|---|---|---|---|---|---|---|
| Sample No. | Initial Potential (V) | Dark Decay Residual Ratio (%) | Half Value Exposure Quantity (lux·sec) | Initial Potential (V) | Dark Decay Residual Ratio (%) | Half Value Exposure Quantity (lux·sec) |
| 1 | 600 | 93.5 | 23 | 60 | 33.3 | — |
| 2 | 645 | 94.0 | 21 | 65 | 33.8 | — |
| 3 | 560 | 94.8 | 21 | 315 | 73.0 | 20 |
| 4 | 540 | 95.4 | 21 | 260 | 63.1 | 23 |

From the above results, it will readily be understood that the charging characteristics can be improved when in the case of the negative charging, the photosensitive layer is formed on the cationic resin-coated surface and the anionic resin is distributed on the other surface and in the case of the positive charging, the photosensitive layer is formed on the anionic resin-coated surface and the cationic resin is distributed on the other surface.

EXAMPLE H

The same photosensitive composition as used in Example G is coated on the wire side face of a support, which has been treated as indicated below, followed by drying to prepare an electrophotographic sensitive paper. Electroconductive resins are used in the form of 10% by weight aqueous solutions.

| Sample No. | Wire Side | Felt Side |
|---|---|---|
| 1 | Chemistat 6039 | Chemistat 6039 |
| 2 | Chemistat 6039 | Chemistat 6120 |
| 3 | Chemistat 6120 | Chemistat 6039 |
| 4 | Chemistat 6120 | Chemistat 6120 |

The so prepared photosensitive papers are tested in the same manner as in Example G to obtain results shown in Table 8.

Table 8

| | Negative Charge | | | Positive Charge | | |
|---|---|---|---|---|---|---|
| Sample No. | Initial Potential (V) | Dark Decay Residual Ratio (%) | Half Value Exposure Quantity (lux·sec) | Initial Potential (V) | Dark Decay Residual Ratio (%) | Half Value Exposure Quantity (lux.sec) |
| 1 | 620 | 94.3 | 22 | 100 | 30.0 | — |
| 2 | 640 | 94.3 | 20 | 116 | 32.8 | — |
| 3 | 530 | 94.5 | 19 | 270 | 61.1 | 17 |
| 4 | 530 | 94.8 | 20 | 118 | 42.4 | 20 |

From the results shown in Table 7, it is seen that effects similar to those obtained in Example G are obtained in this Example.

EXAMPLE H

The wire side face of high quality paper is coated with a cationic electroconductive resin (ECR-34) and the felt side face is coated with an anionic electroconductive resin (Oligo-Z) to form an electroconductive support.

A 15% by weight tetrahydrofuran solution of a vinyl chloride-vinyl acetate copolymer (Eslec C manufactured by Sekisui Chemical) is coated on the anionic resin-coated surface of the support, followed by drying, to form an electrostatic recording paper having a dielectric layer having a thickness of 10μ. Recording is conducted under application of a negative voltage by using a commercial fascimile device for electrostatic recording. A recorded image having a record density of 1.5 is obtained.

What we claim is:

1. An electroconductive substrate for an electrically responsive recording material comprising a porous substrate and a layer of at least one electric conductor selected from the group consisting of cationic conductors and anionic conductors, said conductor layer being formed in the porous substrate along the entire thickness direction thereof extending from one surface of said porous substrate to the other surface of said porous substrate, wherein said conductor layer has a three layer distribution structure comprising (a) a layer of a cationic electroconductive resin distributed predominantly in the one surface portion of the porous substrate, (b) a layer of an anionic electroconductive resin distributed predominantly in the other surface portion of the porous substrate, and (c) a layer of a polysalt of the cationic electroconductive resin and the anionic electroconductive resin interposed between both the electroconductive resin layers (a) and (b) in such a positional relationship that the polysalt layer (c) is adjacent to said electroconductive resin layers (a) and (b), wherein said three layer distribution structure is formed by impregnating one surface of the porous substrate with the cationic electroconductive resin and impregnating the other surface of the porous substrate with the anionic electroconductive resin.

2. An electroconductive substrate as set forth in claim 1 wherein the porous substrate is a paper having a thickness of 30 to 100μ.

3. An electroconductive substrate as set forth in claim 1 wherein the cationic electroconductive resin is a thermoplastic polymer having a quaternary ammonium group bonded to the main or side chain of the polymer at a concentration of 200 to 1000 meq per 100 g of the polymer and a monovalent anion as the counter ion.

4. An electroconductive substrate as set forth in claim 1 wherein the anionic electroconductive resin is a thermoplastic polymer having an anionic group selected from the group consisting of carboxylic, sulfonic and phosphonic groups bonded to the main or side chain of the polymer at a concentration of 200 to 1200 meq per 100 g of the polymer and a monovalent cation as the counter ion.

5. An electroconductive substrate as set forth in claim 1 wherein each of the cationic and anionic electroconductive resins is applied in an amount coated of 0.5 to 10 $g/m^2$.

6. An electroconductive substrate as set forth in claim 5 wherein the ratio of the amount coated ($D_C$) of the cationic electroconductive resin to the amount coated ($D_A$) of the anionic electroconductive resin, namely the ratio $D_C/D_A$, is within a range of from 0.4 to 2.2.

7. The electroconductive substrate according to claim 1 wherein said electroconductive substrate has a rectifying property ($P_R$) of at least 50, said rectifying property ($P_R$) being defined by the following formula:

$$P_R = I_F/I_R$$

wherein $I_F$ stands for an electric current obtained when the cationic resin layer is connected to the anode side and the anionic resin is connected to the cathode side (forward connection) and $I_R$ stands for an electric current obtained when the connection is reversed (reverse connection).

8. An electroconductive substrate as set forth in claim 1 in which the rectifying property $P_R$ is at least 100.

9. An electroconductive substrate as set forth in claim 1 wherein the multi-layer distribution structure is formed by impregnating one surface of the porous substrate, which has been impregnated with at least one member selected from the group consisting of water-soluble inorganic salts and organic moisture-absorbing substances, with the cationic electroconductive resin and impregnating the other surface of said porous substrate with the anionic electroconductive resin.

10. An electroconductive substrate as set forth in claim 9 wherein the water-soluble inorganic salt is an alkali metal or ammonium salt of a monobasic inorganic salt and the inorganic salt is impregnated in the porous substrate in an amount coated of 1 to 15 $g/m^2$.

11. An electroconductive substrate as set forth in claim 9 wherein the organic moisture-absorbing substance is a polyhydric alcohol and the polyhydric alcohol is impregnated in the porous substrate in an amount coated of 1 to 15 $g/m^2$.

12. An electroconductive substrate as set forth in claim 1 wherein the polysalt layer (c) has a thickness corresponding to 3 to 90% of the total thickness of the conductive layer.

13. An electroconductive substrate as set forth in claim 12 in which the thickness of the polysalt layer (c) corresponds to 40 to 90% of the total thickness of the conductive layer, and the humidity dependence of the electric conductivity ($D_H$) defined by the following formula:

$$D_H=(\log R_1-\log R_2)/30$$

wherein $R_1$ stands for the volume intrinsic resistivity (ohm-cm) of the electroconductive substrate at a relative humidity of 30% and $R_2$ stands for the volume intrinsic resistivity of the electroconductive substrate at a relative humidity of 60% is not higher than 0.040.

14. An electroconductive substrate as set forth in claim 5 in which the thickness of the polysalt layer (c) corresponds to 5 to 90% of the total thickness of the conductive layer.

15. An electroconductive substrate as set forth in claim 14 wherein the polysalt layer (c) has a thickness corresponding to 5 to 50% of the total thickness of the conductive layer.

16. An electroconductive substrate for an electrically responsive recording material comprising a porous substrate and a layer of at least one electric conductor selected from the group consisting of cationic conductors and anionic conductors, said conductor layer being formed in the porous substrate along the entire thickness direction thereof extending from one surface of said porous substrate to the other surface of said porous substrate, wherein said conductor layer has a three layer distribution structure comprising (a) a layer of a cationic electroconductive resin distributed predominantly in the one surface portion of the porous substrate, (b) a layer of an anionic electroconductive resin distributed predominantly in the other surface portion of the porous substrate and (c) a layer of a polysalt of the cationic electroconductive resin and the anionic electroconductive resin interposed between both the electroconductive resin layers (a) and (b) in such a positional relationship that the polysalt layer (c) is adjacent to said electroconductive resin layers (a) and (b), wherein the three layer distribution structure is formed by performing the operation (A) of dipping the porous substrate in a solution of the cationic electroconductive resin and the operation (B) of dipping the porous substrate in a solution of the anionic electroconductive resin in the time sequence of (A) to (B) or (B) to (A), to thereby form the polysalt layer (C) extending along the entire thickness direction of the porous substrate, forming, by coating, the cationic electroconductive layer (a) on one surfade of said polysalt layer (c) and forming, by coating, the anionic electroconductive resin layer (b) on the other surface of the polysalt layer (c).

* * * * *